United States Patent [19]

Ichikawa et al.

[11] Patent Number: 4,985,285
[45] Date of Patent: Jan. 15, 1991

[54] LIQUID CRYSTAL DISPLAY PANEL INCORPORATING AN OPTICAL PHASE SHIFTING SUBSTRATE

[75] Inventors: Rinjiro Ichikawa; Kenji Hashimoto, both of Tokyo, Japan

[73] Assignee: Fujimori Kogyo Co., Ltd., Tokyo, Japan

[21] Appl. No.: 343,304

[22] Filed: Apr. 26, 1989

[51] Int. Cl.⁵ .......................... G02F 1/13; G02F 1/23
[52] U.S. Cl. ...................................... 428/1; 350/330; 350/346
[58] Field of Search ..................... 428/1; 350/346, 330

[56] References Cited

U.S. PATENT DOCUMENTS 4,456,638 6/1984 Petcavich ................................ 428/1

OTHER PUBLICATIONS

Nikkei Microdevices, Oct. 1987, pp. 84–88.

*Primary Examiner*—Alexander S. Thomas
*Attorney, Agent, or Firm*—Armstrong, Nikaido, Marmelstein, Kubovcik & Murray

[57] ABSTRACT

A liquid crystal display panel incorporating an optical phase shifting substrate which comprises a liquid crystal cell, a pair of polarizing sheets disposed on opposing sides thereof, and a couple of substrates each having a transparent electrode layer, one of the substrates being either an optical phase shifting single oriented synthetic resin film or a laminate film comprising an optically isotropic amorphous film laminated to at least one side of the above optical phase shifting film and the other substrate being either a single-layer or multi-layer optically isotropic amorphous film or a glass sheet.

1 Claim, 1 Drawing Sheet

LIQUID CRYSTAL DISPLAY PANEL INCORPORATING AN OPTICAL PHASE SHIFTING SUBSTRATE

BACKGROUND OF THE INVENTION

This invention relates a liquid crystal display panel using an optical phase shifting substrate and more particularly to a liquid crystal display panel of improved contrast and reduced angle-of-vision dependency.

The liquid crystal display panel in general comprises a liquid crystal cell and a polarizing sheet disposed on either side of said cell and its basic structure may be represented by the scheme: Polarizing sheet/liquid crystal cell/polarizing sheet Of these constituent members, the liquid crystal cell comprises a pair of substrates each carrying a transparent electrode layer on one side thereof as disposed face-to-face with a spacer means interposed between the respective transparent electrode layers, with the gap between the two substrates having been filled with a liquid crystal material and the peripheral edges of the assembly sealed off with an epoxy or other adhesive. The schematic of the assembly thus constructed is:

Substrate/transparent electrode/liquid crystal/transparent electrode/substrate

Each of these substrates must be optically transparent and isotropic. Otherwise, the product liquid crystal display panel will be seriously colored and thereby interfere with a visual recognition of the information displayed. Therefore, it is essential that an amorphous material be chosen for the substrates and, for this reason, sheet glass substrates have been used almost exclusively. However, glass substrates are heavy in weight and cannot be thinned beyond a certain limit. Moreover, these substrates are liable to be broken, i.e. of poor impact resistance, and cannot be taken up on a roll or the like for mass production. Recently, therefore, synthetic resin films have come to be used for the substrates.

Liquid crystal display panels are used in quantities today in the display units of office automation devices such as word processors, personal computers and so on, and recently STN (super-twisted nematic) liquid crystals have been developed and used especially for large-sized liquid crystal display panels. In this system, however, the background is colored yellow, green or deep blue and, therefore, provides only a poor contrast. Moreover, there is the problem of angle-of-vision dependency, which means that the contrast deteriorates when the display panel is viewed at an angle. Therefore, this system has not fully satisfied the users' demand for improvement in visual recognizability.

Recently, however, thanks to the various improvements made in the aspect of liquid crystal structure and material, several large-capacity simple matrix liquid crystals with increased levels of blackness with enhanced contrast have been introduced one after another. Also high-contrast, substantially perfect black-and-white display panels and their color versions have been implemented.

Of these newer panels, the most noteworthy is the panel in which the color of yellow, green or deep blue has been cancelled by the use of two STN liquid crystal cells in overlapping relation. In the cell forming the second layer of this panel structure, the orientation of liquid crystal molecules has been twisted in the reverse direction to cancel out the color produced in the first layer (Nikkei Micro Device, August 1987 issue, pp. 36–38 and Nikkei Micro Device, October 1987 issue, pp. 84–88).

However, while the above published simple matrix liquid crystal panel for black-and-white high-contrast displays has been designed to improve the contrast by superimposing a liquid crystal cell on another cell to render the color neutral (gray), the use of two liquid crystal cells of necessity makes the whole liquid crystal panel much heavier and thicker. This results in that the system is contrary to the current trend toward reduced weight and thickness of the panel. Moreover, this display panel gives rise to a color when viewed at an angle, thereby leaving room for improvement in the aspect of angle-of-vision dependency.

It is an object of this invention to provide a liquid crystal display panel which, while satisfying the aforesaid requirements for reduced weight and reduced thickness, has realized a marked improvement in contrast by way of color neutralization and, at the same time, has virtually eliminated the problem of angle-of-vision dependency, thus overcoming the abovementioned disadvantages of the prior art.

SUMMARY OF THE INVENTION

The liquid crystal display panel incorporating an optical phase shifting substrate according to this invention comprises a liquid crystal cell 1 and a pair of polarizing sheets 2 disposed on both sides thereof, said liquid crystal cell 1 including substrates 3, 4 each supporting a transparent electrode, one of said substrates 3,4 being an optical phase shifting substrate which comprises either an oriented synthetic resin optical phase shifting film A or a laminate film consisting of said oriented synthetic resin film A and an optically isotropic amorphous film B disposed on at least one side thereof and the other substrate being an optically isotropic substrate comprising a single-layer or multiple-layer optically isotropic amorphous film or a glass sheet.

DETAILED DESCRIPTION OF THE INVENTION

Liquid crystal cell 1

Figure 1:
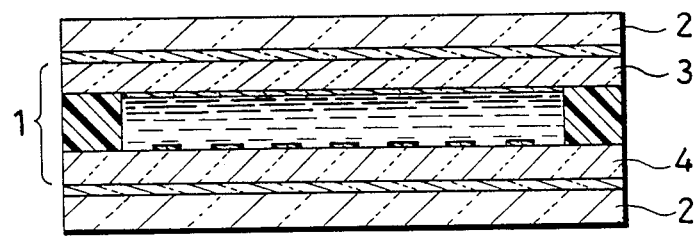
FIG. 1 is a cross-sectional view showing an example of the liquid crystal panel of this invention.

The conventional liquid crystal cell in common use includes two juxtaposed glass sheets, both of which are optically isotropic, as substrates for supporting transparent electrodes.

In contrast, the liquid crystal cell 1 used in this invention includes, as a substrate 3 for supporting one of transparent electrodes of the cell, either an oriented synthetic resin optical phase shifting film A or a laminate film consisting of said film A and an optically isotropic amorphous film B disposed on at least one side thereof and, as another substrate 4 for supporting the other transparent electrode, an optically isotropic substrate comprising either a single-layer or multiple-layer optically isotropic amorphous film B or a glass sheet C.

Optical phase shifting substrate

As mentioned above, the optical phase shifting substrate is either (i) a single oriented synthetic resin film A or (ii) a laminate film consisting of said oriented single film A and an optically isotropic amorphous film B disposed at least on one side of A.

As examples of said optical phase shifting film A, there may be mentioned oriented amorphous films of polymers with a glass transition temperature not less than 60° C., such as polycarbonate, phenoxy resin, polyparabanic acid resin, fumaric acid resin, polyamino acid resin, polystyrene, polysulfone, polyethersulfone, polyarylene ester, polyvinyl alcohol, ethylene-vinyl alcohol copolymer, polyvinyl chloride, polymethyl methacrylate, polyester and cellulosic and other polymers.

The optical phase shifting single film A can be manufactured by orienting the corresponding high polymer at a suitable temperature and, if necessary, subjecting the oriented film to aging.

When the optical phase shifting single film A is manufactured by stretching, the conditions such as stretching temperature, draft ratio, aging temperature and aging time are dependent on the kind of polymer used and cannot be defined in general terms. Generally speaking, however, the stretching temperature is higher than the glass transition temperature of the material polymer (preferably higher than the glass transition temperature by at least 10° C.), the draft ratio is about 1.1 to 8, the aging temperature is over said glass transition temperature, and the aging time is about 1 to 300 seconds. Stretching is generally monoaxial but biaxial stretching is applicable to some types of polymers.

While the molecular orientation is usually achieved upon stretching, there are cases in which the necessary orientation takes place in the course of sheet formation. Moreover, because of their inherent optical rotation characteristics, some kinds of polymers undergo molecular orientation spontaneously.

The above-mentioned optical phase shifting single film A can be singly used as a substrate 3 for supporting one of the transparent electrodes of liquid crystal cell 1. However, in this case, it is necessary to select a film which is resistant to liquid crystals and solvents and has hardness and thickness values not less than certain respective thresholds.

The optical phase shifting single film A is more frequently used as a laminate with an optically isotropic amorphous film B at least on one side thereof. Examples of such lamination are A/B, B/A/B, A/B/B, B/B/A/B/B. An adhesive layer may be interposed between respective layers of the laminate.

Irrespective of whether the optical phase shifting substrate is (i) or (ii), the total retardation value of the substrate is desirably not less than 60 nm and preferably not less than 70 nm. Though the upper limit for this value is not critical, it is generally about 1000 nm. The transparency of the substrate is desirably not less than 60 percent, while its heat resistance is preferably not less than 60° C. This substrate is preferably resistant to chemicals (solvent resistance). The thickness of this optical phase shifting substrate is desirably about 5 to 3000 μm and preferably about 7 to 3000 μm.

The optically isotropic amorphous film (B) includes, to name only a few preferred examples, films of polycarbonate, polyparabanic acid resin, fumaric acid resin, polystyrene, polyethersulfone, polyarylene ester, cellulosic polymer, gas-impermeable synthetic resin, cured crosslinkable resin and so on.

As examples of the cured film of crosslinkable resin, there may be mentioned the films formed from crosslinkable resin compositions each comprising at least one member of the group consisting of phenoxyether crosslinkable resin, epoxy resin, acrylic resin, acryl epoxy resin, melamine resin, phenolic resin and urethane resin and a crosslinking agent capable of reacting with active hydrogen. Particularly useful is the film formed from a phenoxyether type crosslinkable resin. The crosslinking agent capable of reacting with active hydrogen is a compound having an isocyanato, carboxy, mercapto or the like reactive group. The curing procedure may be simple heating or irradiation with an actinic radiation (ultraviolet light, electron beam, etc.).

Furthermore, as examples of the gas-impermeable synthetic resin film, among the above-mentioned preferred examples of optically isotropic amorphous film B, there may be mentioned polymer films having an oxygen permeability (as determined in accordance with ASTM D-1434-75) of not more than 30 cc/24 hr·m$^2$·atm, preferably not more than 20 cc/24 hr·m$^2$·atm, and more specifically the films formed from polymers each containing at least 50 mole percent of acrylonitrile, vinyl alcohol or vinylidene halide and any of the above-mentioned groups reactive to crosslinkable resins. Particularly useful, among such polymers, are OH-containing polymers such as polyvinyl alcohol, either as such or as modified by copolymerization or graft copolymerization, and ethylene-vinyl alcohol copolymer with an ethylene content of 15 to 50 mole percent.

When the above-mentioned cured crosslinkable resin film and gas-impermeable synthetic resin film layers are disposed adjoining to each other, the crosslinking agent used in the curing of the former film advantageously insures an intimate adhesion of the two layers without the aid of an adhesive layer. Moreover, in this laminar construction, the latter layer makes up for the disadvantage, i.e. brittleness, of the former layer, while the former layer makes up for the disadvantage, i.e. moisture permeability, of the latter layer.

In addition to the examples given hereinabove, the optically isotropic amorphous film B can be formed from such other materials as polyester, polysulfone, polymethyl methacrylate, polyvinyl chloride, polyvinylidene chloride, polyacetate, poly-4-methylpentene-1, polyphenylene oxide and other resins.

The above optically isotropic amorphous film B should have a retardation value (where a plurality of layers are used, the total retardation value) of not more than 50 nm and preferably not more than 40 nm.

Optically isotropic substrate

As the optically isotropic substrate which is to constitute another substrate 4 for supporting the other transparent electrode of liquid crystal cell 1, either a single-layer or multiple-layer optically isotropic amorphous film B or a glass sheet C is employed.

The above optically isotropic amorphous film B may be the same as the one described hereinbefore for the optical phase shifting substrate.

The optically isotropic amorphous film B can be used as it is for the substrate 4 supporting said other transparent electrode of liquid crystal cell 1. However, it is necessary to select a film which is resistant to liquid crystals and solvents and has hardness and thickness values in excess of certain limits.

More generally, the optically isotropic amorphous film B is a laminate film consisting of two or more kinds of films B with or without the interposition of an adhesive layer. Particularly when a cured crosslinkable resin film layer and a gas-impermeable synthetic resin film layer are disposed adjoining to each other, the advantages of the respective layers can be exploited while the disadvantages are made up for successfully.

The single-layer or multiple-layer optically isotropic amorphous film B should have a retardation value (total retardation value) of not more than 50 nm and preferably not more than 40 nm. The light transparency of the film is desirably not less than 60 percent, while its heat resistance is preferably not less than 60° C. Furthermore, this film B is preferably resistant to chemicals (solvent resistance). The thickness of the optically isotropic substrate is preferably in the range of 20 to 1000 μm and, for still better results, about 50 to 800 μm. In the case of glass sheet, its thickness may range from about 0.3 to 3 mm.

Transparent electrodes

The transparent electrode is a transparent electrode layer formed by a known procedure such as vacuum vapor deposition, sputtering, ion plating, metal spraying, metal plating, chemical vapor deposition or spraying. Among these techniques, vacuum vapor deposition and sputtering are preferred because a thin film of uniform thickness can be produced.

As the material for said transparent electrode layer, various metals such as Sn, In, Ti, Pb, Tb, etc. and oxides thereof are generally employed. When an elementary metal is used, the resulting film on the substrate can be subsequently oxidized in situ. While a metal oxide layer may be directly formed on the substrate, it is also possible to form a metal film or a low-oxide film in the first place and, then, subject the film to oxidation or additional oxidation through for example, thermal oxidation, anodic oxidation or liquidphase oxidation techniques to obtain a transparent film. When a low-temperature sputtering equipment is employed, the thermal oxidation can be omitted. Aside from the metals mentioned above, noble metals such as Au, Pt and Ag may also be used in certain cases. The above metal or metal oxide electrically conductive layer is formed in a thickness suited to required characteristics such as transparency, electrical conductivity, etc. and is generally not less than 100 Å and, for insuring stable electrical conductivity, preferably not less than 300 Å.

Liquid crystal

As the liquid crystal, super-twisted nematic (STN) liquid crystals are employed with advantage.

Polarizing sheet 2

As examples of the polarizing sheet 2, there may be mentioned polarizing films of the following systems: (a) polyvinyl alcohol-iodine, ethylene-vinyl alcohol copolymer/iodine, etc. and (b) polyvinyl alcohol/two-tone dye, ethylene-vinyl alcohol copolymer/two-tone dye, ethylene-vinyl alcohol copolymer/polyene, polyvinyl alcohol/polyene, polyvinyl halide/polyene, polyacrylonitrile/polyene, polyacrylate/polyene, polymethacrylate/polyene, etc. or laminates of such polarizing films with optically isotropic amorphous films B which have been described hereinbefore.

In the liquid crystal display panel of this invention, as a substrate 3 for supporting one of transparent electrodes of a liquid crystal cell 1, the aforementioned oriented synthetic resin optical phase shifting film A or said laminate film consisting of such oriented optical phase shifting film A and said optically isotropic amorphous film as disposed on at least one side of A is used in lieu of the conventional glass substrate. Thus, it has been designed that this optical phase shifting substrate may play not only the role of a substrate for supporting a transparent electrode but also the role of improving the contrast effect and eliminating the angle-of-vision dependency of the liquid crystal display panel.

Furthermore, in this invention, either a singlelayer or multiple-layer optically isotropic amorphous film substrate B or a glass sheet C, which is also optically isotropic, is used as the substrate 4 for supporting the other transparent electrode of liquid crystal cell 1. In the case of said amorphous film substrate B, compared with glass sheet C, the weight and thickness of the liquid crystal cell can be decreased and, moreover, its impact resistance is improved. In the case of glass sheet C, the total weight of the liquid crystal cell can be decreased because the substrate 3 for supporting the other transparent electrode is not made of glass.

As described above, the liquid crystal display panel of this invention has fulfilled the long-standing need for neutralization of its color and consequent improvement of contrast and for improvement of angle-of-view dependency while satisfying the requirements of reduced panel weight and thickness.

Furthermore, since the optical phase shifting substrate itself functions as a substrate for supporting the transparent electrode of a liquid crystal cell, the liquid crystal display panel of this invention offers the following advantages over a known display panel in which the liquid crystal cell is provided with an independent phase sheet. Thus, the complicated step of attaching a phase plate to the liquid crystal panel with an adhesive is eliminated and both the "slip" phenomenon and "tunneling" phenomenon (formation of voids) due to thermal degradation or aging of the adhesive layer securing the phase sheet to the panel are also eliminated.

EXAMPLES

The following examples are further illustrative of this invention. In the examples, all parts are by weight.

EXAMPLE 1

FIG. 1 is a cross-sectional view showing an example of the liquid crystal display panel of this invention.

Optical phase shifting single film A

In 150 parts of methylene chloride was dissolved 10 parts of a polycarbonate derived from bisphenol A, with stirring. The resulting solution was cast on a glass plate and dried at 40° C. to give a transparent film with a thickness of 58 μm. This film was monoaxially stretched in a draft ratio of 3 in an atmosphere at 180° C. and then aged.

The above procedure provided an optical phase shifting single film which was 32 μm thick and had a retardation value of 143 nm.

Optically isotropic amorphous film B

On a biaxially oriented polyester film with a thickness of 188 μm was cast a 16% solution of an ethylene-vinyl alcohol copolymer (ethylene content 32 mole %) in a 50:50 (w/w) mixture of water and isopropyl alcohol, followed by drying to give a gas-impermeable synthetic resin layer B-1 with a thickness of 12 μm. On top of this layer was directly cast a phenoxyether crosslinkable resin composition shown below, followed by drying to form a cured crosslinkable resin layer B-2 with a thickness of 20 μm.

| | |
|---|---|
| Phenoxyether resin (Union Carbide) | 40 Parts |
| Methyl ethyl ketone | 40 Parts |
| Cellosolve acetate | 20 Parts |
| Tolylene diisocyanate-trimethylolpropane adduct, 75% solution (Coronate L, Japan Polyurethane) | 40 Parts |

Then, the laminate film was peeled off the biaxially oriented polyester film to give a two-layer optically isotropic amorphous film of B-1/B-2 structure.

Two optically isotropic films of B-1/B-2 structure as prepared by the above procedure were laminated to each other with an acrylic adhesive in such a manner that the respective B-1 layers would adjoin each other face-to-face to provide a four-layer optically isotropic amorphous film of B-2/B-1/B-1/B-2 structure.

Optical phase shifting substrate

Then, on either side of the above optical phase shifting single film A, the two-layer optically isotropic amorphous film (B-1/B-2) prepared as above was laminated using an acrylic adhesive to fabricate an optical phase shifting substrate of the B-2/B-1/A/B-1/B-2 structure.

This optical phase shifting substrate had a thickness of about 106 μm, a retardation value of 145 nm, a visible light transmittance of 87%, an oxygen permeability (as determined in accordance with ASTM D-1434-75) of 1.2 cc/24 hr·m$^2$·atm, and a surface pencil hardness of 2H. The substrate was moisture-proof.

Optically isotropic substrate

The four-layer optically isotropic amorphous film of B-2/B-1/B-1/B-2 structure described above was used as the optically isotropic substrate in this example.

This optically isotropic substrate had a thickness of about 75 μm, a retardation value of 2 nm, a visible light transmittance of 92%, an oxygen permeability (as determined in accordance with ASTM D-1434-75) of 0.8 cc/24 hr·m$^2$·atm, and a surface pencil hardness of 2H. This substrate was moisture-proof.

Formation of transparent electrodes

An indium tin oxide (ITO) layer with a thickness of 320 Å is formed on one side of each of the above optical phase shifting substrate and optically isotropic substrate.

Fabrication of liquid crystal cell 1

After the above formation of transparent electrodes, using an epoxy adhesive as a sealant an STN (super-twisted nematic) liquid crystal with a twist angle of about 210° was filled into the gap between the optical phase shifting substrate and the optically isotropic substrate to fabricate an STN liquid crystal cell.

Liquid crystal display panel

A pair of an iodine type polarizing sheets 2, 2 each having a visible light transmission of 42% and a degree of polarization of 86% were laid with the respective optical axes at right angles on both sides of the above liquid crystal cell to fabricate the product liquid crystal display panel.

This liquid crystal display panel had a neutral color under no energization but when an electric voltage of 7 volts was applied, the display area turned deep gray-blue with a satisfactory contrast ratio of 9:1 and an improved angle-of-view dependency.

COMPARATIVE EXAMPLE 1

A liquid crystal display panel was fabricated in the same manner as Example 1 except that an STN liquid crystal was sealed into the gap between two optically isotropic sheets each carrying a transparent electrode. This display panel was green under no energization but when a voltage of several volts was applied, assumed a deep blue color. The contrast ratio was as small as 3:1.

EXAMPLE 2

Optical phase shifting single film A

In a 1:1 (w/w) mixture of tetrahydrofuran and dimethylformamide were dissolved 22 parts of polyvinyl chloride resin and 6 parts of polymethyl methacrylate and the solution was cast on a glass plate and dried at 85° C. to give a film with a thickness of 82 μm.

This film was monoaxially stretched in a draft ratio of 5 in an atmosphere at 130° C. and, then, aged at the same temperature.

The above procedure provided an optical phase shifting single film A having a thickness of 43 μm and a retardation value of 138 nm.

Optical phase shifting substrate

A two-layer optically isotropic amorphous film of B-1/B-2 structure, similar to the one used in Example 1, was laminated onto either side of the above optical phase shifting single film A to give an optical phase shifting substrate.

This optical phase shifting substrate had a thickness of about 117 μm, a retardation value of 141 nm, a visible light transmittance of 86%, an oxygen permeability (as determined in accordance with ASTM D-1434-75) of 0.9 cc/24 hr·m$^2$·atm, and a surface pencil hardness of 2H. The substrate was moistureproof.

Optically isotropic substrate

A two-layer optically isotropic amorphous film of B-1/B-2 structure, similar to the one used in Example 1, was laminated onto either side of a polycarbonate film (manufactured by Mitsubishi Chemical Industries, Ltd.) having a thickness of 90 μm and a retardation value of 18 nm to give an optically isotropic substrate.

This optically isotropic substrate had a thickness of about 164 μm, a retardation value of 23 nm, a visible light transmittance of 90%, an oxygen permeability (as determined in accordance with ASTM D-1434-75) of 0.7 cc/24 hr·m$^2$·atm, and a surface pencil hardness of 2H. This substrate was moisture-proof.

Formation of transparent electrodes

Transparent electrodes were formed in the same manner as Example 1; provided, however, that the thickness of the ITO layer was 460 Å.

Fabrication of liquid crystal cell 1

A liquid crystal cell was fabricated in the same manner as Example 1.

Liquid crystal display panel

A pair of iodine type polarizing sheets 2, 2 each having a visible light transmittance of 38% and a degree of polarization of 98% were set up with the respective optical axes at right angles on either side of the above liquid crystal cell to fabricate a liquid crystal display panel.

This liquid crystal display panel had a neutral color under no energization but when a voltage of 7 volts was applied, its display area turned deep gray-blue with a satisfactory contrast ratio of 8:1 and an improved angle-of-vision dependency.

EXAMPLE 3

A phenoxyether crosslinkable resin composition similar to the one used in Example 1 was cast on a glass plate and dried in an atmosphere at 70°–80° C. for 60 minutes to give a crued crosslinkable resin film having a thickness of 130 μm. This film was monoaxially stretched in a draft ratio of 2 at 145° C. and aged at the same temperature for 20 minutes.

The above procedure gave an optical phase shifting single film A having a thickness of 98 μm and a retardation value of 108 nm. This film was used singly as the optical phase shifting substrate.

Then, a liquid crystal display panel was fabricated under otherwise the same conditions as Example 1. The color and contrast of this panel were comparable to those of the panel fabricated in Example 1 and the degree of improvement in angle-of-view dependency was even higher than that achieved in Example 1.

EXAMPLE 4

Optical phase shifting single film A

In a mixture of 50 parts of methyl ethyl ketone and 50 parts of cellosolve acetate were dissolved 55 parts of phenoxyether resin (same as that used in Example 1) and 50 parts of Coronate L with stirring at room temperature. This solution was cast on a glass plate and allowed to stand in an atmosphere at 70° C. for about 40 minutes, whereby a homogenous cured crosslinkable resin film with a thickness of 80 μm was obtained.

The above film was monoaxially stretched at 150° C. in a draft ratio of 3.6 and further aged at the same temperature for 20 minutes.

The above procedure provided a optical phase shifting single film A having a thickness of 53 μm and a retardation value of 125 nm.

Optically isotropic amorphous film B

An ethylene-vinyl alcohol copolymer solution, similar to the one used in Example 1, was cast on a 100 μm-thick biaxially oriented polyester film and dried to give a gas-impermeable synthetic resin layer B-1 with a thickness of 25 μm. On top of this layer was directly cast a phenoxyether crosslinkable resin composition similar to that used in Example 1. After drying, aging was performed at 130° C. for 20 minutes to give a cured crosslinkable resin layer B-2 with a thickness of 18 μm.

Then, this laminate was peeled off the biaxially oriented polyester film to give a two-layer optically isotropic amorphous film of B-1/B-2 structure having a thickness of 43 μm.

A couple of optically isotropic amorphous films of the above B-1/B-2 structure were laminated together with the aid of an acrylic adhesive in such a manner that the respective B-1 layers would adjoin each other face-to-face to give a four-layer optically isotropic amorphous film of B-2/B-1/B-1/B-2 structure.

Optical phase shifting substrate

Then, the above two-layer optically isotropic amorphous film of B-1/B-2 structure was laminated onto either side of the above optical phase shifting single film with the aid of an acrylic adhesive to prepare an optical phase shifting substrate which had the B-2/B-1/A/B-1/B-2 structure.

The above optical phase shifting substrate had a thickness of about 149 μm, a retardation value of 127 nm, a visible light transmittance of 87%, an oxygen permeability (as determined in accordance with ASTM D-1434-75) of 0.6 cc/24 hr·m$^2$·atm and a surface pencil hardness of 2H. This substrate was moistureproof.

Optically isotropic substrate

The above 4-layer optically isotropic amorphous film of B-2/B-1/B-1/B-2 structure was used as the optically isotropic substrate in this example.

This optically isotropic substrate had a thickness of about 202 μm, a retardation value of 4 nm, a visible light transmittance of 89%, an oxygen permeability (as determined in accordance with ASTM D-1434-75) of 0.6 cc/24 hr·m$^2$·atm, and a surface pencil hardness of 2H. This substrate was moisture-proof.

Liquid crystal display panel

A liquid crystal display panel was fabricated under otherwise the same conditions as Example 1. In color, display-background contrast and angle-of-view dependency, this display panel was comparable to the panel obtained in Example 1.

EXAMPLE 5

Optical phase shifting single film A

In 80 parts of dimethylformamide was dissolved 10 parts of an acrylonitrile-methyl acrylate copolymer consisting of 95 parts of acrylonitrile and 5 parts of methyl acrylate at a temperature of about 60° C. and the resulting solution was cast on a glass plate and dried in an atmosphere at about 75° C. to give a transparent film with a thickness of 115 μm. Then, in an atmosphere at 130°–140° C., this film was first stretched monoaxially in a draft ratio cf 1.5 and, then, stretched at an angle of 90° with the direction of the first stretching in a draft ratio of 5.

The resulting oriented film having a thickness of 46 μm and a retardation value of 280 nm was used as the optical phase shifting single film A in this example.

Optical phase shifting substrate

Using an urethane adhesive, an optically isotropic film of B-1/B-2 structure having a retardation value of 3 nm and a thickness of 33 μm, to be described below, was laminated onto either side of the above optical phase shifting single film A in such a manner that the B-1 side would adjoin the film A to give an optical phase shifting substrate of B-2/B-1/A/B-1/B-2 structure having a thickness of 130 μm. This substrate had a retardation value of 292 nm, a visible light transmittance of 85%, and an oxygen permeability of 1.4 cc/24 hr·m$^2$·atm.

The composition of the urethane adhesive mentioned above was as follows.

| | |
|---|---|
| Takelac A-371 (manufactured by Takeda Chemical Industries, Ltd.) | 45 Parts |
| Takenate A-10 (Curing agent) (manufactured by Takeda Chemical Industries, Ltd.) | 7 Parts |

-continued

| Ethyl acetate | 50 Parts |

Optically isotropic amorphous film B

In a 50/50 (w/w) mixture of water and isopropyl alcohol was dissolved an ethylene-vinyl alcohol copolymer with an ethylene content of 28% at a final concentration of 13% and the solution was cast on a 100 μm-thick biaxially oriented polyester film and dried to form a moisture-proof synthetic resin layer B-1 with a thickness of 9 μm. On top of this layer was directly cast a photocurable resin composition of the following composition and dried at 80° C. Then, the whole surface was irradiated with ultraviolet light using a 200-watt chemical lamp for 5 minutes to provide a UV-cured resin layer B-2 with a thickness of 24 μm.

| | |
|---|---|
| Phenoxyether resin | 40 Parts |
| (manufactured by Union Carbide) | |
| Trimethylolpropane triacrylate | 20 Parts |
| Bisphenol A-diglycidylether-acrylic acid adduct | 20 Parts |
| Benzoin ethyl ether | 3 Parts |
| Dioxane | 300 Parts |

Then, this laminate B-1/B-2 film was peeled off the biaxially oriented polyester film to give an optically isotropic amorphous film with a thickness of 33 μm and a retardation value of 3 nm.

Optically isotropic substrate

Using the same urethane adhesive as described above, the above optically isotropic amorphous film of B-1/B-2 structure was laminated onto either side of a polycarbonate film having a thickness of 50 μm and a retardation value of 7 nm in such a manner that the B-1 side adjoined the polycarbonate film. The resulting optically isotropic substrate of B-2/B-1/polycarbonate/B-1/B-2 structure had a thickness of 126 μm, a visible light transmittance of 89% and an oxygen permeability of 1.8 cc/24 hr·m²·atm.

Formation of transparent electrodes

Under the following sputtering conditions, an ITO film having a thickness of 420 Å was formed on one side of each of the above optical phase shifting substrate and optically isotropic substrate.

| | |
|---|---|
| Target | In₂O₃ 95 Weight % |
| | SnO₂ 5 Weight % |
| Pressure | 4 × 10⁻³ Torr |
| Output | 450 Watt |
| Deposition speed | 8 Å/second |

Fabrication of liquid crystal cell 1

A liquid crystal cell 1 was fabricated in the same manner as Example 1.

Liquid crystal display panel

A pair of iodine type polarizing sheets 2, 2 each having a visible light transmittance of 42% and a degree of polarization of 86% were set up with the respective optical axes at right angles on the respective sides of the above liquid crystal cell to fabricate a liquid crystal display panel.

The resulting liquid crystal display panel had a neutral color under no energization but when a voltage of 10 volts was applied, its display area assumed a deep gray-blue color with a satisfactory contrast ratio of 6:1 and an improved angle-of-vision dependency.

EXAMPLE 6

Optical phase shifting single film A

In 90 parts of a 7:3 (w/w mixture of dichloroethane and perclene was dissolved 10 parts of polyamino resin (Ajicoat ®, manufactured by Ajinomoto Co., Inc.) and the resulting solution was cast on a 100 μm-thick biaxially oriented polyester film to give an optical phase shifting single film A having a thickness of 47 μm, a retardation value of 110 μm and a visible light transmission of 92%.

Optically isotropic amorphous film B

In 90 parts of dimethylformamide was dissolved 10 parts of an acrylonitrile-methyl acrylate copolymer (a copolymer of 95 parts of acrylonitrile and 5 parts of methyl acrylate) and the resulting solution was cast on a 100 μm-thick biaxially oriented polyester film to provide a gas-impermeable synthetic resin film B-1 having a thickness of 9 μm. On top of this film B-1 was further cast a 20% solution of a polyparabanic acid resin in a 50/50 (w/w) mixture of dimethylformamide and N-methylpyrrolidone to form a polyparabanic acid resin film layer B-3 with a thickness of 21 μm.

After drying, the resulting laminate was peeled off the biaxially oriented polyester film to give an optically isotropic amorphous film of B-1/B-3 structure.

Optical phase shifting substrate

Using the urethane adhesive described in Example 5, the above optically isotropic amorphous film was laminated onto each side of the above-prepared optical phase shifting single film A to give an optical phase shifting substrate of B-3/B-1/A/B-1/B-3 structure having a thickness of 117 μm.

Optically isotropic substrate

The same optically isotropic substrate as that used in Example 5 was used.

Fabrication of liquid crystal cell 1

A liquid crystal cell was fabricated in the same manner as Example 1.

Liquid crystal display panel

A pair of iodine type polarizing sheets 2, 2 each having a visible light transmission of 42% and a degree of polarization of 86% were set up with the respective optical axes at right angles on the respective sides of the above liquid crystal cell to manufacture a liquid crystal display panel.

This liquid crystal display panel had a neutral color under no energization but when a voltage of 5 volts was applied, its display area assumed a deep gray-blue color with a satisfactory contrast ratio of 7:1 and an improved angle-of-vision dependency.

EXAMPLE 7

Glass sheet

The 0.7 mm-thick glass plate hitherto used for liquid crystal cells was used.

Optical phase shifting single film A

In 150 parts of methylene chloride was dissolved 15 parts of a bisphenol A-based polycarbonate with stirring and the resulting solution was cast on a glass sheet and dried at 40° C. to give a transparent film with a thickness of 70 μm. This film was monoaxially stretched in a draft ratio of 3 in an atmosphere at 180° C. and, then, aged.

The above procedure gave an optical phase shifting single film A having a thickness of 43 μm and a retardation value of 152 nm.

Optically isotropic amorphous film B

The procedure described in Example 1 was followed to provide a two-layer optically isotropic amorphous film of B-1/B-2 structure. However, the thickness of B-1 layer and that of B-2 layers were set at 10 μm and 15 μm, respectively.

Optical phase shifting substrate

Then, using an acrylic adhesive, the two-layer optically isotropic amorphous film of B-1/B-2 structure prepared as above was laminated onto either side of the above optical phase shifting single film A to fabricate an optical phase shifting substrate of B-2/B-1/A/B-1/B-2 structure.

The above optical phase shifting substrate had a thickness of about 113 μm, a retardation value of 158 nm, a visible light transmittance of 87%, an oxygen permeability (as determined in accordance with ASTM D-1434-75) of 1.8 cc/24 hr·m²·atm, and a surface pencil hardness of 2H. This substrate was moisture-proof.

Formation of transparent electrodes

By the sputtering technique, a ITO layer with a thickness of 380 Å was formed on one side of each of the above 0.7 mm-thick glass sheet and optical phase shifting substrate.

Fabrication of liquid crystal cell 1

Two transparent electrodes were formed each on the above glass sheet and optical phase shifting substrate and, then, using an epoxy adhesive as a sealant, an STN (super-twisted nematic) liquid crystal with a twist angle of about 220° was sealed into the gap between the glass sheet and the optical phase shifting substrate to fabricate an STN liquid crystal cell.

Liquid crystal display panel

A pair of iodine type polarizing sheets 2, 2 each having a visible light transmittance of 42% and a polarization degree of 86% were set up with the respective optical axes at right angles on either side of the above liquid crystal cell to construct a liquid crystal display panel.

This liquid crystal display panel had a neutral color under no energization but when a voltage of 6 volts was applied, its display area assumed a deep gray-blue color with a satisfactory contrast ratio of 8:1 and an improved angle-of-view dependency.

COMPARATIVE EXAMPLE 2

A liquid crystal display panel was fabricated in the same manner as Example 7 except that the STN liquid crystal was sealed between the two glass sheets after formation of transparent electrodes as in Example 7. This liquid crystal display panel was green under no energization but when a voltage of several volts was applied, the display area turned deep blue with a contrast ratio of 3:1.

EXAMPLE 8

Glass sheet

The 1.2 mm-thick glass sheet of the type hitherto used for liquid crystal cells was employed.

Optical phase shifting single film A

In a 1:1 (w/w) mixture of tetrahydrofuran and dimethylformamide were dissolved 24 parts of polyvinyl chloride resin and 7 parts of polymethyl methacrylate resin and the solution was cast on a glass sheet and dried at 85° C., whereby a film with a thickness of 90 μm was obtained.

The above film was monoaxially stretched in a draft ratio of 4 in an atmosphere at 130° C. and, then, aged at the same temperature.

The above procedure gave an optical phase shifting single film A having a thickness of 46 μm and a retardation value of 135 nm.

Optical phase shifting substrate

A two-layer optically isotropic amorphous film of B-1/B-2 structure, similar to that used in Example 7, was laminated onto either side of the above optical phase shifting single film A to give an optical phase shifting substrate.

This optical phase shifting substrate had a thickness of about 120 μm, a retardation value of 138 nm, a visible light transmission of 86%, an oxygen permeability (as determined in accordance with ASTM D-1434-75) of 1.2 cc/24 hr·m²·atm., and a surface pencil hardness of 2H. This substrate was moisture-proof.

Formation of transparent electrodes

Transparent electrodes were formed in the same manner as Example 7; however, that the thickness of the ITO layer was 460 Å.

Fabrication of liquid crystal cell 1

A liquid crystal cell was fabricated in the same manner as Example 7.

Liquid crystal display panel

A pair of iodine type polarizing sheets 2, 2 each having a visible light transmission of 38% and a polarization degree of 98% were set up with the respective optical axes at right angles on either side of the above liquid crystal cell to manufacture a liquid crystal display panel.

This liquid crystal display panel had a neutral color under no energization but when a voltage of 6 volts was applied, its display area turned deep gray-blue with a satisfactory contrast ratio of 7:1 and an improved angle-of-view dependency.

EXAMPLE 9

The phenoxyether crosslinkable resin composition described in Example 1 was cast on a glass sheet and dried in an atmosphere at 70°-80° C. for 60 minutes to give a cured crosslinkable resin layer with a thickness of 130 μm. This film was monoaxially stretched in a draft ratio of 2 at 145° C. and, then, aged at the same temperature for 20 minutes.

The resulting optical phase shifting single film A having a thickness of 98 μm and a retardation value of 108 nm was used singly as the optical phase shifting substrate.

Then, a liquid crystal display panel was manufactured under otherwise the same conditions as used in Example 7. In color and display-background contrast, this display panel was equivalent to the panel fabricated in Example 7. Furthermore, the degree of improvement in angle-of-view dependency was even greater than in Example 7.

EXAMPLE 10

Glass sheet

A 1.5 mm thick glass sheet of the type hitherto used for liquid crystal cells was employed.

Optical phase shifting single film A

The same optical phase shifting single film A as that used in Example 6 was employed.

Optically isotropic amorphous film B

The same optically isotropic amorphous film B of B-1/B-3 structure as that used in Example 6 was employed.

Optical phase shifting substrate

Using the urethane adhesive described in Example 5, the above optically isotropic amorphous film B was laminated onto either side of said optical phase shifting single film A to give an optical phase shifting substrate of B-3/B-1/A/B-1/B-3 structure having a thickness of 117 μm.

Fabrication of liquid crystal cell 1

A liquid crystal cell was fabricated in the same manner as Example 7.

Liquid crystal display panel

A pair of iodine type polarizing sheets 2, 2 each having a visible light transmission of 42% and a polarization degree of 86% were set up with the respective optical axes at right angles on either side of the above liquid crystal cell to provide a liquid crystal display panel.

This liquid crystal display panel had a neutral color under no energization but when voltage of 5 volts was applied, its display area turned deep gray-blue with a satisfactory contrast ratio of 7:1 and an improved angle-of-view dependency.

What is claimed is:

1. A liquid crystal display panel incorporating an optical phase shifting substrate comprising:
    a liquid crystal cell formed of a first and second substrate having a super-twisted nematic liquid crystal sealed therebetween, each of said substrates supporting a transparent electrode;
    said first substrate being an optical phase shifting substrate having a retardation value of not less than 60 nm comprising either an oriented synthetic resin optical phase shifting film A or a laminate film consisting of said oriented synthetic resin film A and an optically isotropic amorphous film B disposed on at least one side thereof;
    said second substrate being an optically isotropic substrate comprising a single-layer or multiple-layer optically isotropic amorphous film having a retardation value of not more than 50 nm, or a glass sheet; and
    a pair of polarizing sheets disposed, respectively, on each side of said liquid crystal cell.

* * * * *